United States Patent [19]

Krumhansl

[11] Patent Number: 4,621,613
[45] Date of Patent: Nov. 11, 1986

[54] POOL AND SPA HEATING AND COOLING

[76] Inventor: Mark U. Krumhansl, 1811 Bent Twig, Tustin, Calif. 92680

[21] Appl. No.: 6,338

[22] Filed: Jan. 25, 1979

[51] Int. Cl.[4] .............................................. F24K 2/42
[52] U.S. Cl. .................................... 126/416; 126/422; 4/493
[58] Field of Search ............... 126/415, 416, 422, 437; 4/489, 493, 509; 137/625.47; 62/238.7, 235.1, 238.6; 237/2 B

[56] References Cited

U.S. PATENT DOCUMENTS

| | | | |
|---|---|---|---|
| 3,868,945 | 3/1975 | Konopka et al. | 126/416 |
| 3,991,742 | 11/1976 | Gerber | 126/416 X |
| 4,007,776 | 2/1977 | Alkasab | 62/235.1 X |
| 4,012,920 | 3/1977 | Kirschbaum | 62/238.7 X |
| 4,052,757 | 10/1977 | Dotson | 126/416 |
| 4,106,482 | 8/1978 | Savage et al. | 126/422 |
| 4,114,600 | 9/1978 | Newton | 126/422 |
| 4,153,955 | 5/1979 | Hinterberger | 126/422 X |
| 4,165,037 | 8/1979 | McCarson | 62/217 X |
| 4,169,491 | 10/1979 | Bajka | 137/625.47 |
| 4,185,333 | 1/1980 | Ortega | 137/625.47 |
| 4,190,199 | 2/1980 | Cawley et al. | 62/235.1 X |
| 4,228,788 | 10/1980 | Moeser | 62/238 E X |

Primary Examiner—Randall L. Green
Attorney, Agent, or Firm—Grover A. Frater

[57] ABSTRACT

The efficiency with which the water in pools and spas may be heated is greatly improved by circulating water through a heat exchanger such that heated water is introduced at or near the lowest point in the body of pool or spa water and by removing water to be heated from a point near the surface notwithstanding that the heated water rises to form a warm layer at the surface. When the body of water is heated to a selected temperature, the flow direction is reversed so that water is withdrawn from the low point and, after heating, is returned to a point nearer the surface. That method has the advantage that it can be practiced with conventional pool and spa plumbing systems with minimum modification to permit a reversal of pool and spa inlet and outlet opening connection to the external water cleaning conduit. Water flow and control in the external circuit remains the same. System operation and practice of the method is enhanced by the inclusion of a solar energy collector and valves of unique design. The energy collector employs a ribbed collector surface and a water flow path in the form of a double spiral of substantially Archimedes form. The valves employ special cores.

10 Claims, 18 Drawing Figures

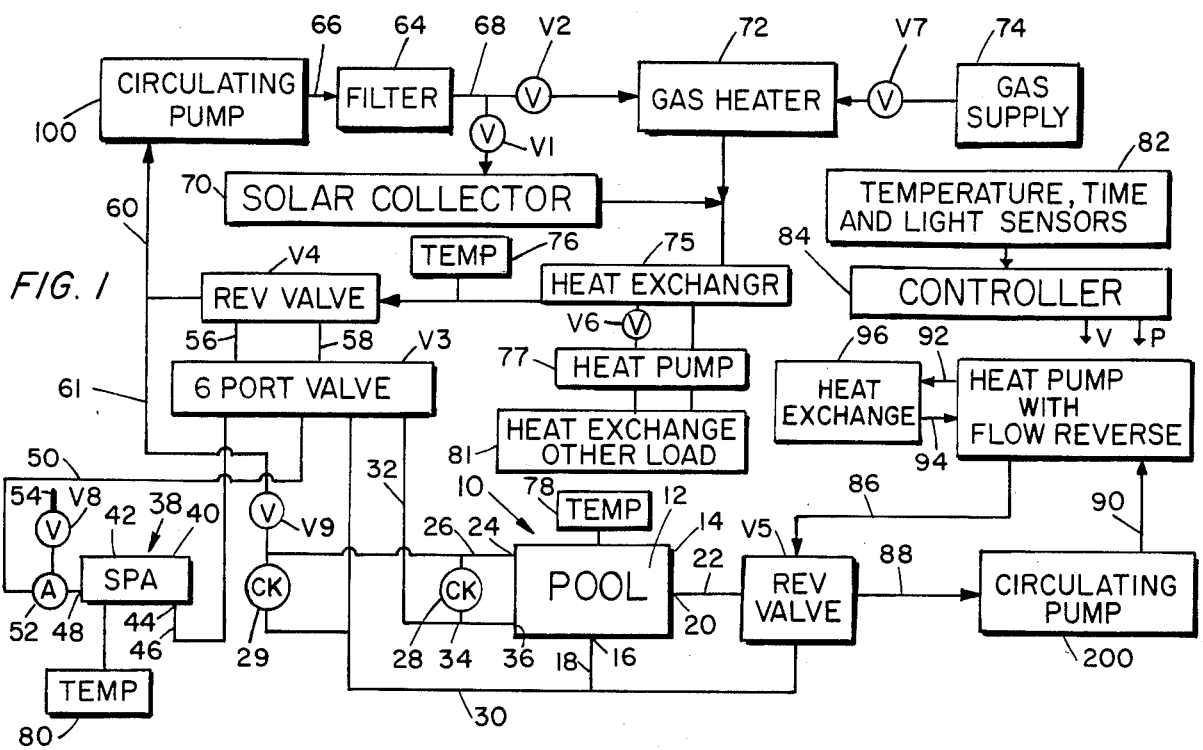
FIG. 1
FIG. 2
| VALVE AND PUMP CONTROL CHART | | | | | | | | |
|---|---|---|---|---|---|---|---|---|
| CONDITION | V1 | V2 | V3 | V4 | V5 | V6 | 100 | 200 |
| HEAT POOL | f(SUN) | f(T) | POOL | REV | – | OFF | ON | OFF |
| NORMAL POOL | f(t,SUN) | OPEN | POOL | NOR | – | OFF | f(TIME) | OFF |
| HEAT SPA | f(SUN) | OPEN | SPA | REV | – | OFF | ON | OFF |
| NORMAL SPA | f(SUN) | OPEN | SPA | NOR | – | OFF | ON | OFF |
| SPACE HEAT | f(SUN) | – | POOL | – | REV | OFF | ON | ON |
| SPACE COOL | – | – | – | – | NOR | OFF | OFF | ON |
| OTHER HEAT | – | – | – | NOR | – | OFF | ON | – |
| OTHER COOL | OFF | OFF | – | REV | – | ON | ON | – |
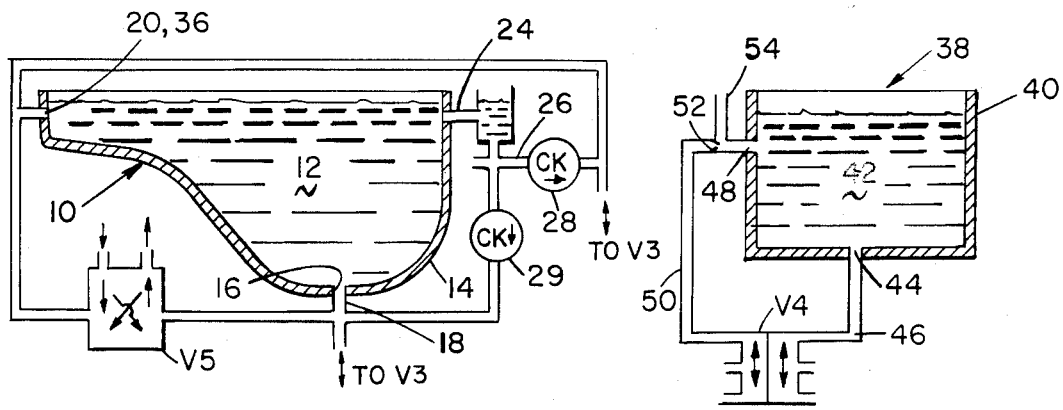
FIG. 3
FIG. 4

POOL AND SPA HEATING AND COOLING

This invention relates to improved methods and means for heating water in swimming pools and spas, both as recreational facilities and as energy storage elements.

BACKGROUND

It is customary to clean the water in swimming pools and spas by withdrawing water from the lowest point in the pool or spa, filtering it, and then returning it to the pool or spa at a point just below the remaining water's surface. In the case of a swimming pool, the system usually includes a "skimmer" for drawing a portion of the circulating water from the upper surface of the body of water. That arrangement facilitates cleaning of the water, and is almost universally employed. In the case of the spa, the inlet is usually placed somewhat lower, and is made the inlet for air as well as water. The air and water are often combined in an aspirating venturi or in a Jacuzzi valve. That arrangement is used to admit a high velocity stream of water and air bubbles as well as being selected to facilitate cleaning of the water.

Thus it is that swimming pools and spas are plumbed and a circulating pump is provided to withdraw water from the low point in the body of pool or spa water and to return it at a higher point, usually near the surface of the body of water. The water circuit includes the outlet, a pump, a filter and the inlet, in series, and the pump usually precedes the filter.

Heating of the water, if that is to be done, is accomplished in a heater unit which is included in series in that circuit between the outlet and inlet. There may be an arrangement for bypassing the heater during intervals when the heater is not in operation, but when in operation the heater is connected in series with the cleaning circuit.

As a consequence of that arrangement, the water in pools and spas is heated by withdrawing cold water from the bottom and supplying heated water to the upper region of the pool. The warm water, being less dense, rises in the pool and the spa and cold water settles to the lower regions. That has some convenience for bathers use the water in the upper regions more than they do the lower water. However, it is found to have a very great disadvantage in that much energy is wasted when heating from the top downward as it requires replacement of the cold water by warm water.

It is one purpose of this invention to provide methods and means for overcoming that disadvantage in large measure.

SUMMARY OF THE INVENTION

It is an object of this invention to provide methods and means for heating and cooling pool water and spa water more efficiently.

It is another object to provide an improved system for heating pool and spa water for recreational use, and it is a related object to provide an improved system for heating and cooling such water as a storage element for storing energy as heat or cold.

Another object is to provide improved apparatus, including improved valves and improved solar collectors for such a system.

A further object is to provide methods and means for heating pool and spa water in less time.

The heat loss from water through the containing walls of a swimming pool, and of a spa, is much less, in most cases, than the loss of heat to the air above the water. That being true, a heating method that delivers heated water to the surface region of a pool maximizes the conditions for heat loss from the surface. In the invention, heated water is introduced at the bottom of the pool. It rises, of course, because of its reduced density, but as it rises heat is transferred to the surrounding water by conduction, and displaces the more dense cold water upward. When it does rise to the surface it has been cooled as a consequence of that heat transfer. The surface temperature and loss to atmosphere are less, and a larger proportion of heat energy input is retained. Instead of being heated layer by layer from upper layer downward, practice of the invention results in less temperature differential within the body of pool or spa water. Heating is more uniform. More heat is retained and heating of the entire body of water is accomplished in shorter time with less energy.

The advantage of this "deep heating" method is greatest at the beginning of the heating period when water temperature is lowest and when heating proceeds at a time when the pool or spa water is not being stirred by use. After the body of water is heated so that all of the water is near desired temperature, the advantage of deep heating is much less. It is preferred at that time, and it is a feature of the invention, to reverse flow to and from the pool or spa, even if heating continues at a low rate to make up surface loss to atmosphere. It is preferred because that method permits the circulation circuit to be used with only minor modification both for rapid deep heating of a cold pool or spa and for normal water cleaning circulation.

The advantage of the invention is even more pronounced in the case of rapid heating of spa water. In the spa, heat loss at the surface is very rapid. Inlet water temperature is usually much greater than in the case of pools, and much of that heat is transferred to the inlet air by evaporation—only to be lost as the air rises in bubbles to the surface. Additionally, the hot inlet water is immediately brought to the surface whereby temperature stratification is impeded. In an ordinary case one can observe the heat loss in observing the mist that rises from the spa and which drifts and is forced away.

The advantage of the invention, in terms of energy saving in initially heating the body of water, can exceed a saving of two-thirds, and the advantage is realized each time that the water is reheated. However, the function of water cleaning proceeds much less efficiently during deep heating, and jet action ceases in the spa during deep heating. Thus, the advantage of deep heating may be lost in large measure unless flow can be reversed. The invention provides flow reversal, and it provides that feature in the preferred mode with a flow reversing valve arranged to interchange the pool and spa inlet and outlet ports while otherwise leaving the series circulation circuit intact.

The flow reversing valves of the invention employ a shaped core to direct flow between different pairs of ports as a function of core position in an arrangement that has a number of advantages, especially in pool and spa heating and cooling. Another feature, important when heating pool and spa water from the same heat source, is a six-port valve of unique design.

The use of those special valves, while not essential to practice of the invention in a broader sense, facilitate practice of another phase of the invention. The water in a swimming pool and in a spa can be made to serve as a storage element for energy in the form of heat or of cold. The same physical arrangement of the water circulating system, to permit deep heating and water cleaning selectively, is useful in carrying heat between the pool or spa and a heat pump. When the heat pump is used to transfer heat from pool or spa water to some heat pump load, a circulation system is employed which draws water from the upper regions of the spa or pool and, after traversing the heat exchanger of the heat pump, returns it to the low point. When heat pump operation is reversed to cool its load, water is removed from the low point of the pool or spa and is returned to an upper region.

Whether the object is to heat the pool or spa water, or to use that water as an energy storage element, the efficiency of the system and its method make it more compatible with solar energy collection heaters, as well as making them more effective and thereby reducing heating time or the amount of solar energy collection surface that is required. To employ such a heater is another object of the invention, and it is a feature to provide a solar energy collector of novel form. Its water path is formed by a double Archimedes spiral arranged so that inlet water is heated by outlet water by conduction. In preferred form, that is accomplished through a common wall. The unit is formed as a panel which is essentially flat except that the energy absorbing surface is formed as a series of elongated ridges, triangular in cross-section and arranged side by side in parallel.

Further, a form of summary of the invention appears in the appended claims and is adopted here by reference. It is the claims that define the scope of the invention. The drawings show one embodiment, the best mode of practicing the invention that is known, but other embodiments are possible.

DESCRIPTION OF THE DRAWINGS

In the drawings:

FIG. 1 is a block diagram of a preferred form of a system which embodies the invention and with which the preferred method of the invention may be practiced;

FIG. 2 is a chart which sets out the manner in which the several valves and pumps are controlled for several different modes of operation of the system depicted in FIG. 1;

FIG. 3 is a diagram of a portion of FIG. 1 showing the swimming pool and its body of water in cross-section and some of the plumbing circuitry associated therewith;

FIG. 4 is a representation of the spa of FIG. 1 in which the spa and the water that it contains are shown in cross-section together with some of the plumbing circuitry associated therewith;

DESCRIPTION OF THE PREFERRED METHOD AND APPARATUS OF THE INVENTION

Figure 5:
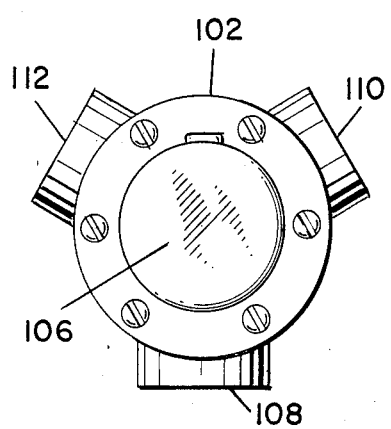
FIG. 5 is a top plan view.

The Method of the Invention and the System of FIG. 1

In FIG. 1, the numeral 10 represents a swimming pool which it will be assumed is filled with water to a level that is usual in the case of swimming pools. The term "pool" and term "swimming pool" is used to mean the combination of the body of water 12 within the pool (see FIG. 3) and the enclosure 14 by which that body of water is contained. An opening 16 is formed through the enclosure at its lowest point, and a water conducting pipe 18 is connected in that opening. A second opening 20, through the enclosure 14, is located a point a short distance below the surface of the body of water 12. A water conducting pipe 22 is connected in that opening.

It is customary for swimming pools to include a "skimmer" which is an apparatus by which the top surface layer of water may be skimmed from the pool and conducted away by a water flow pipe. In FIG. 1, the numeral 24 represents the point at which the skimmer is located, and the numeral 26 designates the flow conduit by which skimmed water is carried away. That pipe includes two check valves, 28 and 29, respectively, which are connected one from line 26 to a flow line 30 and the other from line 26 to a flow line 32. Line 32 is shown, in FIG. 1, to extend to the pool where it connects with another opening 36 through the enclosure 14 to afford communication from the pipe 32 to the body of pool water 12. Opening 36 extends through the enclosure at a point near the upper surface of the body of water 12. Openings 20 and 36 may, in fact, be the same opening, and in this case they are as best illustrated in FIG. 3.

Numeral 38 generally designates a spa comprising an enclosure 40 for a body of water 42. There is an opening through the enclosure at 44 which connects to a water flow pipe 46. The opening 44 is placed at the low point in the spa. A second opening 48 through the enclosure 40 is placed at a higher point, closer to the upper surface of the body of water 42. That opening is connected to a water flow line 50 which includes an aspirator 52. That is a venturi device that aspirates air into the flow line 50 from an air inlet pipe 54 which includes an air shut-off valve V8. That structure is shown in greater detail in FIG. 4.

The water flow lines 30, 32,, 46 and 50 are connected to the six port valve, V3. Two other lines, 56 and 58, respectively, are connected from other ports of valve V3 to the ports of a reversing valve V4. The six port valve, V3, is arranged in two sections. The valve and the core are arranged, in preferred form, to occupy one of two different positions. In one position, line 56 is connected to line 46 and line 58 is connected to line 50. In the other position of the valve core, line 56 is connected to line 30 and line 58 is connected to line 32. Thus it is that operation of the six port valve determines which of the two units, the spa or the swimming pool, are connected by lines 56 and 58 to the reversing valve V4. In addition to line 56, two other lines, output line 60 and input line 62, are connected to the reversing valve. That valve has a core which occupies either of two positions. In one position, input line 62 is connected to line 56 and line 58 is connected to output line 60. In the other position of the reversing valve, line 62 is connected to line 58 and line 56 is connected to line 60. Line 60 is arranged to conduct water from the reversing valve V4 to a means for cleaning the water. That means may comprise a biological treatment and a chemical treatment unit and a filter, or other apparatus. In most cases only a filter need be employed, and only a filter is shown in FIG. 1 where it bears the identifying number 64.

Before entering the filter 64, by line 66, water proceeds through flow line 60 to a circulating pump 100. Ordinarily a centrifugal pump, this unit is simply a means for causing water to circulate through a conduit which begins at one of the openings through the spa or pool container and proceeds through the six port valve and the reversing valve, and through the circulating pump and the filter, a solar collector and/or gas heater, a heat exchanger 75, back to the reversing valve, and then to the other opening in the container of the spa or pool, as the case may be. Water always proceeds in the same direction on the pump side of the remaining valve V4. After leaving the circulating pump 100, the water traverses one or both of two parallel water heating units. Flowing out of the filter by line 68, water proceeds through valve V1 and a solar collector 70 to the flow line 62 if valve V1 is open, and it flows from the line 68 through a valve V2 through a gas fired heater 72 to flow line 62 if valve V2 is open. The energy for the gas heater is derived through valve V7 from a gas source which is represented here by the block 74.

A means is provided for measuring the temperature in the spa and in the pool, or, in the preferred form shown, for measuring temperature in the circulating conduit at a point just downstream from the heaters which can be taken as a measure of the temperature in the body of water residing in the pool or spa. The sensor is designated by the reference numeral 76. The preferred embodiment includes that sensor and a second sensor 78 which measures the temperature of water at a point in the swimming pool and a temperature sensor 80 which measures water temperature at a point in the spa.

In addition, these several temperature sensors and a timer and a sunlight sensor are represented, collectively, by the box 82 which has an output connected to control a valve and pump controller represented by box 84. Among the valves controlled is a reversing valve V5 to which flow lines 22 and 30 are connected along with flow lines 86 and 88. Flow line 88 interconnects the reversing valve and a circulating pump 200 which draws water from the reversing valve and delivers it by a flow line 90 to a heat pump 91 of a kind that includes a four way reversing valve within its refrigerant circuit so that the heat pump can pump heat in reverse directions. Flow of water proceeds from the heat pump through line 86 back to the reversing valve V5. Flow lines 92 and 94 are heat pump refrigerant flow lines which connect the heat pump to a load. In this case, the load is a heat exchanger and blower 96 which may be employed as a space heater. The heat exchanger 75 is arranged to transfer heat between the pool or spa water that circulates in the external circuit and the refrigerant material of a second heat pump 77 through a valve V6. The other side of the heat pump is connected to another heat exchanger 81 which is arranged to extract heat from, or supply heat to, another load here called "OTHER LOAD."

The system of FIG. 1 can be employed in any of six modes of operation. Those modes are listed in the condition column at the left of FIG. 2. The first mode is labelled "HEAT POOL" to indicate that the function to be performed is to heat the water in the swimming pool. That mode is employed when it is desired to heat the body of water in the pool rapidly and efficiently. The controller is caused, either manually or automatically, to open valve V1 to permit the flow of water through the solar energy collector 70 if heating is to be accomplished at a time when there is sunlight, and the collector will collect energy rather than dissipate it. If the energy collected by the solar collector 70 is adequate so that the temperature sensor 76 is sufficiently great, the controller will cause the valve V2 to remain closed. Otherwise that valve will be open and gas supplied to the gas heater 72 from supply 74 so that water passing through heater 72 is heated. The six-port valve V3 is adjusted so that it is the pool 10, rather than the spa 38, that is connected to the reversing valve V4. The reversing valve is placed in its reverse flow position. In that position, line 62 is interconnected with line 56. Line 56 is connected by the six-port valve to the line 30 of the pool plumbing system. Line 32 of that system is connected by the six-port valve to line 58 and line 58 is connected to the output line 60 of the reversing valve.

The position of valve V5 is unchanged. Its position is unimportant because no water flows through it. The controller 84 does not energize the circulating pump 200. However, controller 84 does energize circulating pump 100 whereby water is caused to flow from the upper opening 36 and flow line 32 and line 58 to the reversing valve, and there it enters the water circulation conduit and circuit formed by line 60, circulating pump 100, line 66, filter 64, line 68, one or both of solar collector 70, and the gas heater 72, and line 62 which terminates at the reversing valve. Water entering the reversing valve at line 62 flows by line 56 and line 30 and line 18 to the lower inlet 16 where it enters the pool and the body of pool water at the lowest point. Entering there, it mixes with the surrounding cool water and transfers most of its heat by mixing and conduction to that surrounding water. The consequence of that is that the density of the entering water is increased, and it rises more slowly through the body of water in the pool, losing heat as it rises. Because of that action, no layer of very warm water is formed at the surface. The differential in temperature between the surface water and the overlying air is less and the consequence of that is that heat loss is reduced from what that loss would be if heated water had been introduced at the upper inlet 20 and 36, in which case a heated upper layer would tend to form. In the invention, the heat introduced into the body of water is employed to heat substantially only cool water and container and is not permitted to heat the atmosphere.

During that mode of operation, which is here referred to as "deep heating," water taken from the pool does flow through the filter unit 64. However, the filtering and the cleaning action that takes place is less efficient than it is when water is delivered to that filter from the lower output 16 of the pool.

To ensure greater efficiency in the cleaning function, and because the advantage of deep heating is largely lost once the body of swimming pool water is heated to a temperature at or near the selected temperature, it is a feature of the invention to reverse the position of the reversing valve V4. That valve is reversed by the controller 84 as a consequence of a signal derived from temperature sensor 76. Thereafter, it is the lower output 16 of the pool enclosure 14 which is connected to the output line 60 of the reversing valve. Water flows from the bottom of the pool to the reversing valve output line 60, and then through the circulating pump 100, line 66, filtering unit 64, line 68, one or both of the heater units 70 and 72, and line 62, back to the reversing valve, and ultimately, by line 32, to the upper inlets 20 and 36 of the pool enclosure.

Referring to FIG. 2, the mode of operation just described is defined as "NORMAL POOL" operation. If the pool temperature is close enough to desired temperature to make deep heating unnecessary, but below a maximum desired temperature, and if there is sunlight so that some heating will take place in the solar collector 70, the valve V1 is opened by the controller 84. Valve V2 is opened in any event to ensure that there will be a flow path through the circulating water conduit in the event that the circulating pump is energized by the controller. It is usual that the circulation of water for cleaning purposes be conducted at selected times. It is not uncommon for the circulating pump to be controlled by a timer so that water is circulated for a number of hours each day, usually during the night or early morning hours. The system depicted in FIG. 1 is arranged in that fashion. Circulation can proceed only if one or both valves V1 or V2 are open. The two valves are employed here so that the heaters can be used selectively or jointly. When water is to be circulated without heating, valve V1 is closed and valve V2 is opened, but the gas heater is not energized. Some heaters are arranged with a bypass valve which opens to bypass the heater whenever the heater is inoperative. The bypass valve is here considered to be part of the gas heater and is not separately shown.

The next condition listed at the left in FIG. 2 is "HEAT SPA." Valve V1 is opened if there is sunlight, and valve V2 is ordinarily opened. The water in spas is usually heated to higher temperatures than are employed in swimming pool water, and in most cases the spa water is not heated unless the spa is going to be used. For those reasons, the gas heater is ordinarily energized and operates in parallel with the solar collector.

In spa heating, the six-port valve is adjusted to connect the spa rather than the swimming pool to the reverse valve V4. Rapid heating of the spa water is accomplished by deep heating. Accordingly, the reversing valve is placed in the reverse position so that hot water flowing in line 62 will proceed through line 56 and 46 to the lower opening in the spa container. A second circulating pump 200 is turned off and the circulating pump 100 is turned on. When the spa water temperature has been increased to a value near desired temperature, the reversing valve is placed in the normal position. Thereafter, water is drawn from the lower opening of the spa container and is returned to the higher level at inlet 48. As shown in FIG. 2, the only difference, other than to operate the air shut-off valve V8 and air blower, if used, between the mode HEAT SPA and the mode NORMAL SPA is that the reversing valve has been reversed. If the several temperature sensors indicate that water temperature has risen to maximum desired value, the controller will operate to close valve V1 and to shut off the gas supply to the heater 72. The air valve V8 is closed in the HEAT SPA mode. In other modes it is open.

The body of water in the pool and the body of water in the spa can be viewed as a large heat sink, or, conversely, as a source of stored heat energy. Using a heat pump, heat can be removed from a load of some kind and transferred by the heat pump to the pool water or the spa water. Conversely, the operation of the heat pump can be reversed. In that case, heat is removed from the body of water and is transferred by the heat pump to some load. The heat pump, like a two phase refrigerator, employs a refrigerant material which is received at a compressor in gaseous form and is compressed until it becomes a liquid. It is heated in the process. If that heat is removed in a first heat exchanger, it can be used to heat a load. Thereafter, the refrigerant is permitted to expand and to become a gas. To do that, the refrigerant must absorb heat. It can, for example, absorb heat from the body of water in the pool or spa in a second heat exchanger. The reversible heat pump includes a valve, or set of valves, which are capable of altering the refrigerant flow path so that it is refrigerant in gaseous form that flows through the first heat exchanger and liquid refrigerant that flows through the second heat exchanger.

In the invention, when using the body of water as a heat source or sink, the water flow circuit between the pool and the heat pump includes a reversing valve connected and operated so that when heat is to be removed from the pool, the pool water is taken from the upper outlet 20, and it is returned at the lower opening 16. Thus arranged, it is warm water from the upper layer of water in the pool that is taken to the heat pump. On the other hand, when heat pump operation is reversed, and the purpose is to remove heat from the load and dissipate it in the pool, the reverse valve is placed in the normal position so that it is cold water, which is more easily heated, which is delivered from the pool to the heat pump. In the drawings, the heat pump 91, reversing valve V5, pump 200 and the heat exchanger 96 are arranged for operation in that fashion. The position of the several valves and the condition of the pumps is depicted in FIG. 2.

In FIG. 2, during SPACE HEAT operation, the valves and pumps are arranged so that heat energy collected at the collector is supplied to the pool water at the same time that heat is transferred from the pool water through the heat pump 91 to the load. In the SPACE COOL mode, unless the water in the solar collector will be heated excessively, the position of valves V1, V2, V3 and V4 is not material.

In some applications, it is preferable to transport the refrigeration material from the heat pump to the heat source, or heat sink, rather than to transport the water, the heat source, or sink, to the heat pump. Such an arrangement is shown in the combination of heat pump 77, heat exchangers 75 and 81 and valve V6. Heat exchanger 75 transfers heat from or to the water circulating in the external spa or pool circuit to or from the refrigerant material of the heat pump. The heat pump transfers heat by the heat exchanger 81 to the "other" load. If the refrigerant is rerouted and heat pump operation is reversed, the heat is transferred by the exchanger 81 from the load. Valve V6 is opened to make the system operative.

In the operating mode SPACE COOL, it is assumed that the objective is to remove heat from a load. To provide cooling or "air conditioning" in a dwelling is one example. In that case the water is drawn from the bottom of the pool and returned near its upper surface. Efficiency is increased when cooling water is cold and water taken from the bottom outlet is colder. However, the objective in another case may be to use a heat pump to remove heat from a load for the purpose of heating the pool or spa water. In such a case it will be preferred to employ deep heating. That mode of operation is called OTHER COOL in FIG. 2, and it is conducted using heat pump 77. The flow reversing valve V4 is used to connect the pool or spa for reverse flow in both the OTHER HEAT and OTHER COOL modes. In each case, the requirement is to optimize the heating of the water and that is done by introducing the heated water at the lower inlet.

It is understood, of course, that both heat pumps include a refrigerant compressor and pump, and that they are controlled, along with the valves, by controller 84. In preferred form all refrigerant and water lines are insulated and the lines illustrated in FIGS. 1 and 2 are all thermally insulated lines.

Six-Port Valve

Figure 6:
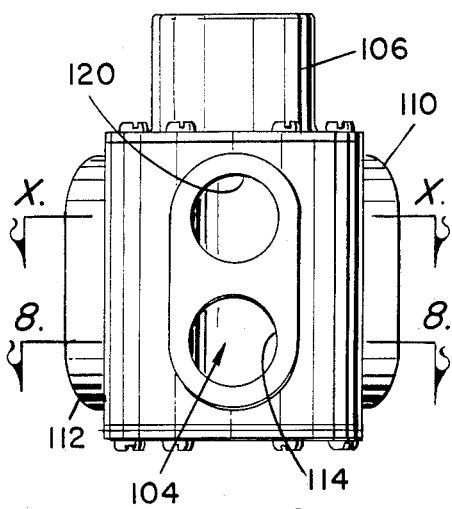
FIG. 6 is a view in side elevation, of a preferred form of the six port valve depicted in FIG. 1.
Figure 7:
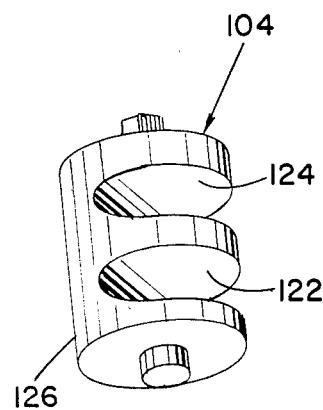
FIG. 7 is a perspective drawing of the core of the valve shown in FIGS. 5 and 6.
Figure 8:
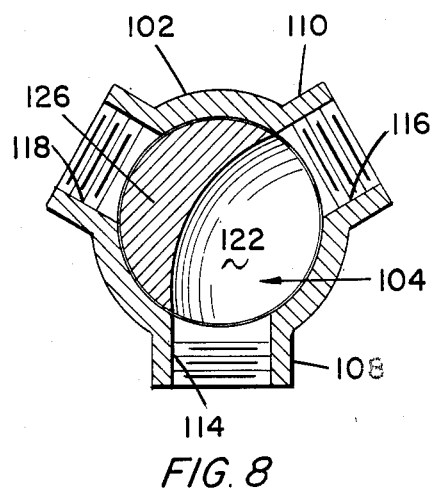
FIG. 8 is a cross-sectional view taken on line 8—8 of FIG. 6.
Figure 9:
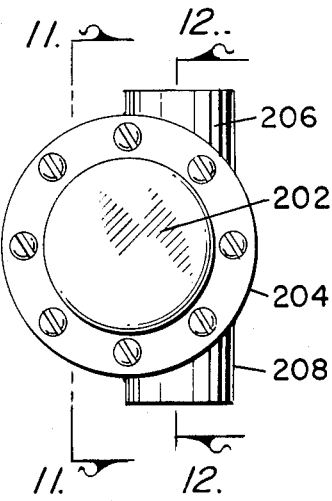
FIG. 9 is a top view of a reversing valve like one employed in FIG. 1.

A six-port valve of the kind that has special utility in the invention is illustrated in FIGS. 5, 6, 7 and 8 of the drawing. The structure consists broadly of three parts. One is a valve body 102; another is a valve core 104; and the third is an electromagnetic actuator 106 by which the controller 84 of FIG. 1 operates the valve. The valve body is generally cylindrical and the interior is hollowed to form a cylindrical cavity in which the cylindrical core 104 is rotatably disposed. Communication between the cavity and the exterior of the housing is afforded through six ports arranged in three pairs, each pair having their axes parallel and arranged to intersect the central axis of the cavity which is substantially coincident with the axis of rotation of the core. The axes of the pairs of ports are angularly displaced about the central axis 120 degrees apart in the preferred embodiment of the invention. Ports are formed through the wall of the housing and through extensions of that wall, arranged so that one extension is associated with each of the pairs of ports. To facilitate understanding, the three extensions have been numbered 108, 110 and 112, respectively. One port of each of the three pairs of ports has its axis lying in a plane that is common to the axis of one of the ports of each of the other two pairs. Moreover the other port of the first pair has its axis lying in a plane common with the axes of the other pair of the other two pairs of ports. That feature is best illustrated in FIGS. 6 and 8. Port 114 of FIGS. 6 and 8 is formed at the lower end of the valve body in the same plane with port 116 and port 118, as shown in FIG. 8.

Returning to FIG. 6, the port 120, which is formed just above the port 114, lies in the same plane as the remaining two ports. Thus, a cross-sectional view taken on line X—X of FIG. 6 would appear just like what is depicted in FIG. 8.

The core 104 of the six-port valve is formed with two cutouts. The cutouts are spaced one above the other along the axis of the core, and they extend from the outer surface more than halfway across the diameter of the core. In the axial direction of the core, each cutout is approximately as wide as the diameter of the several port openings with no reduction in cross-sectional area. As best shown in FIG. 8, where the core 104 is shown in a cross-section taken at the transverse mid-plane through the lower cutout in FIG. 7, the walls 122 that define that lower cutout cooperate with the interior wall of the housing 102 to form a flow path for water. In FIG. 8 they form a flow path between the ports 114 and 116. Similarly, the wall 124 that forms the upper cutout of the core cooperates with the inner wall of the housing to form a second flow path between port 120 and the unnumbered port that is formed in the upper portion of the extension 110.

The portion 126 of the core that is adjacent the two cutouts, but is not cut away, serves to close port 118 and the other, unnumbered, port in the extension 112. It will be apparent from an inspection from the several figures that rotation of the core about its angle will result in closure of others of the several ports and the creation of a flow path between other pairs of the upper three ports and the lower three ports.

The six-port valve, here shown, is the preferred form of the valve that can have other forms. Considered more broadly, it is a multiple section valve. Each section is capable of inclusion in a circuit independent of the circuits in which other sections may be included. The sections are stacked physically along the rotational axis of the core so that a single core and housing is common to the sections. Further, the number of ports that open to each section can be increased or decreased. When increasing the number of ports per section, it will be necessary to alter the degree of the core cutout in terms of the amount of the outer circumference that will remain, but cutout size is readily determined once the basic construction is understood as herein explained.

The Reversing Valve

Figure 10:
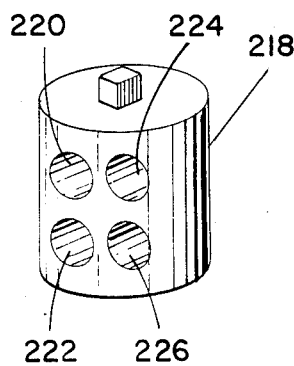
FIG. 10 is a perspective drawing of the core of the valve shown in FIG. 9.
Figure 11:
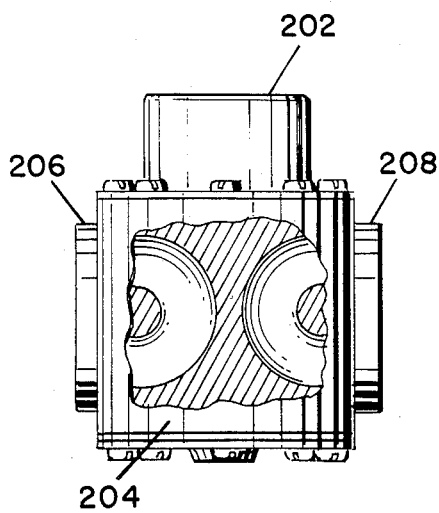
FIG. 11 is an elevational view of a fragment of the valve shown in FIG. 9 which has been cross-sectioned on line 11—11 to show the U-shaped passage ways that are formed in the core of FIG. 10.
Figure 12:
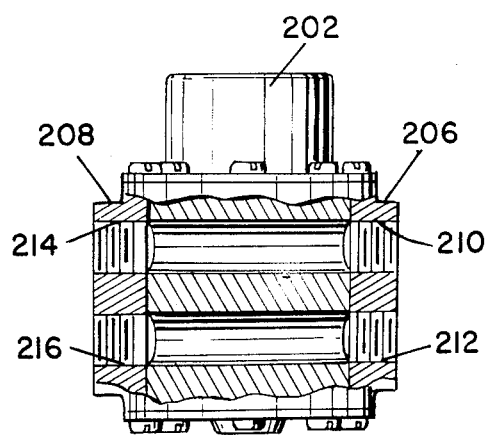
FIG. 12 is a view in elevation of a fragment of the valve shown in FIG. 9 which has been sectioned along line 12—12 of FIG. 9 to show the two straight through passages that are formed in the core of FIG. 10.

A flow reversing valve of preferred form and of the type depicted in FIG. 1 at valve V5 is shown in FIGS. 9, 10, 11 and 12 of the drawing. This valve comprises three main parts. One is an electromagnetic actuator 202 by which the controller 84 of FIG. 1 controls valve operation. Another main portion of the valve is its housing 204. That housing is generally cylindrical in form and has a central cavity of cylindrical form whose axis is substantially coincident with the axis of the valve body. In this valve, there are two extensions or protrusions formed on the exterior surface of the valve body. Those extensions are identified by the reference numerals 206 and 208 in FIGS. 9, 11 and 12. As best shown in FIG. 12, there is a pair of ports 210 and 212, formed through the extension 206 and through the wall of the valve body at one side of the body. There is a second set of ports 214 and 216, formed through the extension 208 and through the wall of the valve body at the side toward extension 208. Ports 210 and 214 have a common axis which lies above the common axis of ports 212 and 216. Those two axes lie in a plane that is parallel to the axis of rotation of the core which is numbered 218 and is depicted in FIG. 10. Returning to FIG. 9, the axis of the four ports lie in the plane identified by line 12—12 in FIG. 9, and that line lies in a plane which is parallel to and displaced to the right of the central vertical axis about which the core 218 is rotatable.

Four passageways are formed in the core 218. Each passageway has an end that opens in the wall of the core so that there are eight openings. Four of those openings are visible in FIG. 10. If the core in FIG. 10 were to be rotated 180 degrees about its central vertical axis, the other four openings would be visible and, at least at the surface of the core, those four openings would look just like those depicted in FIG. 10. The openings in FIG. 10 are arranged one above the others in pairs. One pair includes the upper opening 220 and the lower opening 222. The other pair includes upper opening 224 and lower opening 226. Opening 220 is formed at one end of a passage that extends straight through the valve core to the upper opening of a similar pair of openings at the opposite side of the core. The opening 222 is the opening at one end of a passage which also extends through the core. That passage opens at an opening which is the lower one of a pair corresponding to the pair 220 and 222. Those two passages are circular. Their axes are parallel, and they lie in a plane that is spaced from the axis of rotation of the core by an amount spaced from the axis of rotation of the core by an amount equal, or substantially so, to the displacement of the plane 12—12 in FIG. 9 from the central axis of the unit.

Openings 224 and 226 are at opposite ends of a U-shaped passageway that is formed in the core 218 and is one of two such U-shaped passages. The other passage interconnects the two openings that correspond to openings 224 and 226 at the other side of the core. The center line of those two U-shaped passages lie on a common plane, and that plane is displaced from the axis of rotation of the core by an amount equal to the separation of the plane 12—12 of FIG. 9 from the central axis of the unit. These several passages, and their openings, are positioned so that they will communicate, four at a time, with ports 210, 212, 214 and 216 in the manner shown in FIGS. 11 and 12.

For the sake of clarity, and because their construction and operation are well known, no attempt has been made to show the valve actuator 202 or the valve actuator 106 in cross-section. However, the valve body has been sectioned along with the valve core in FIGS. 11 and 12. The core 218 occupies the same rotational position relative to the housing in both FIGS. 11 and 12. The core is positioned so that the passageways that terminate in openings 220 and 222 lie on plane 12—12 of FIG. 9. Thus positioned, those two passageways afford communication between ports 210 and 214, and between ports 212 and 216.

The core 218 is oriented within the housing 204 so that the two U-shaped passageways lie in the plane of line 11—11. The core is sectioned on that plane in FIG. 11 so that the two passageways are visible. A comparison of FIGS. 11 and 9 will show that neither one of the U-shaped passages will lie in the plane of line 12—12 of FIG. 9 and the two straight through passages will lie in the plane of line 11—11. In that circumstance, the two straight through passages will not communicate with any one of the ports. Instead, one U-shaped passage will interconnect ports 210 and 212, and the other U-shaped passages will interconnect ports 214 and 216. Thus it is that the valve can, by rotation of its core, be used to connect port 214 to either of ports 210 or 216, and to connect port 212 to either of ports 212 or 216. Thus, it serves as a flow reversing valve.

Figure 17:
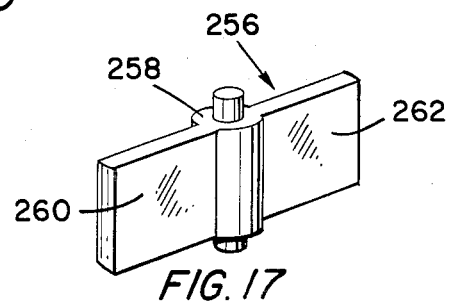
FIG. 17 is a perspective view of the core of the valve of FIG. 16.
Figure 18:
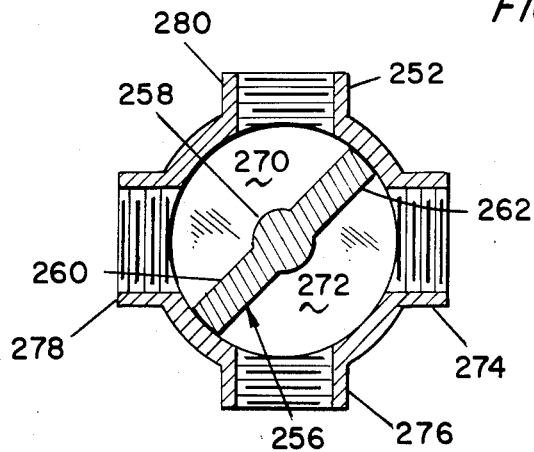
FIG. 18 is a cross-sectional view taken on line 18—18 of FIG. 15.
Figure 16:
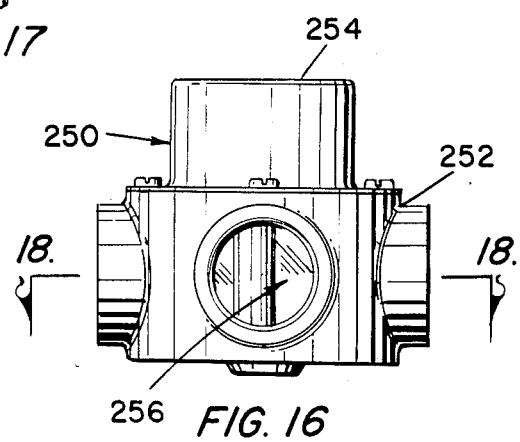
FIG. 16 is a view in elevation of a reversing valve like one employed in FIG. 1.

Another preferred form is shown in FIGS. 16, 17 and 18. This is the form employed in valve V4 of FIG. 1. In this application, water pressure is low and flow volume is high. The valve 250, shown in these figures, is entirely adequate and reliable despite its structural simplicity. Like the others, it is formed of three main sections, a body 252, and actuator 254, and a core 256. The body defines a cylindrical cavity in which the core 256 is disposed for rotation on the common axis of cavity and core. The core comprises a central cylindrical portion 258 the axis of which is coincident with the axis of core rotation. A pair of arms 260 and 262 is integrally formed with the central portion such that they extend in opposite radial directions respectively from the core across the diameter of the cavity. The height of the central portion and arms correspond to the height of the body cavity of the valve. Thus, the core serves to divide the cavity into two smaller cavities, identified in FIG. 18 as cavity 270 and cavity 272.

There are a plurality of ports formed radially through the wall of the valve body at radially extending fittings. There are four such fittings, or extensions, in this case, numbered 274, 276, 278 and 280, respectively, and they are arranged with their center lines ninety degrees apart in the mid-plane of the valve body perpendicular to the axis of core rotation. In the position the core occupies in FIG. 18, there is communication between the ports in extensions 274 and 276 through sub-cavity 272, and between the ports in extensions 278 and 280 through sub-cavity 270. Upon rotation of the core through ninety degrees in either direction, that communication is ended and communication is established between the ports of extensions 274 and 280, and between the ports of extensions 276 and 278. The valve is designed to maintain full cross-sectional flow path area and the flow direction need change no more than ninety degrees.

Again, this is the preferred form of valve V4. The same basic construction can be employed using other numbers of ports and other numbers of core arms and direction of radial extension for other applications.

The Solar Collector

Figure 13:
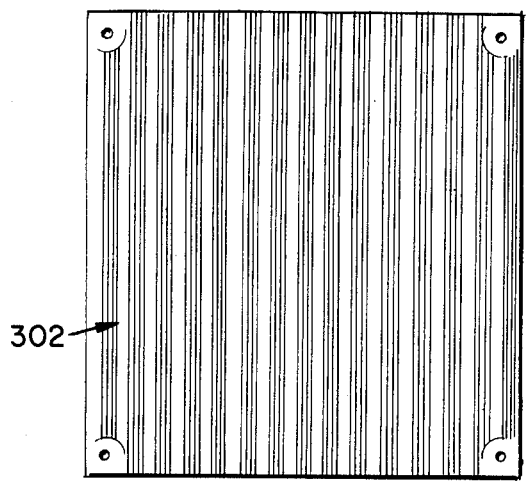
FIG. 13 is a top plan view of a preferred form of the solar heat collector that is employed in FIG. 1.
Figure 14:
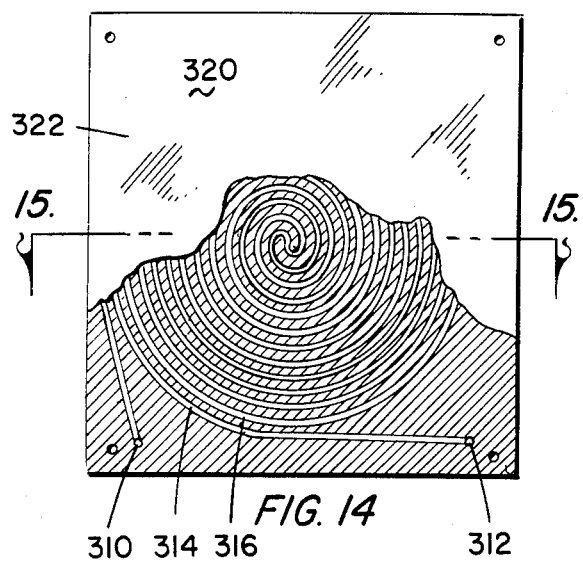
FIG. 14 is a bottom plan view of the solar energy collector of FIG. 13 with a portion of its insulating layer broken away to expose the water flow path within the collector.
Figure 15:
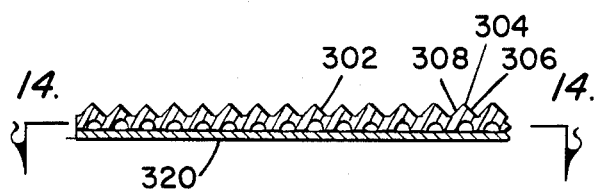
FIG. 15 is a cross-sectional view taken on line 15—15 of FIG. 14.

The solar collector of FIGS. 13, 14 and 15 includes a number of novel features which make it a superior converter for heating of water using solar energy. In the preferred form depicted in the drawings, the unit comprises two main parts. One is a cover plate 302 whose solar energy receiving upper surface is formed by a plurality of ribs that are arranged in parallel, side by side, over the whole of the energy receiving surface except at the corners where the end ribs are cut away to accommodate elements for fastening the collectors in appropriate mounting structures. In the interest of clarity, fewer ridges, and larger ridges, than are actually preferred in practice have been shown in the drawing. It will be apparent that the triangular sections need be less high, so that a considerable saving in material can be realized, if the number of triangular ribs is increased and their height reduced by making them smaller. The angle of the sides should be between thirty degrees and forty-five degrees from horizontal in the preferred form of the invention. That configuration optimizes energy collection and minimizes reflection. Notwithstanding "shadowing" when the sun is low, the triangular rib construction collects more energy over a wider range of directional orientation and sun elevations. For identification, one of the ribs has been identified by the reference numeral 304, and the sides of that rib have been designated 306 and 308, respectively. In the preferred form, all of the ribs, other than those at the end where the mounting holes are located, are alike.

The lower face of the solar collector is provided with channels which open at the lower face and extend upwardly into the plate. When that lower face of the plate is covered with a sheet of flat insulating material, the channels will serve as a flow path for water from an inlet connection to an outlet connection. The channels are arranged so that the flow path for exiting water lies adjacent the flow path for entering water. In the preferred form, the walls between adjacent flowpaths form uninterrupted thermal paths. They share a common wall. That is a primary feature of the design and the invention. The flow paths are arranged so that there is heat transfer between heated water that has traversed most of the collector and the newly arriving water that has traversed less than half of the collector flow path. That can be accomplished in a number of flow path configurations, but the preferred configuration is a double Archimedes spiral, or something approximate to that configuration, in which two flow paths, one originating at the water inlet and the other originating at the water outlet, are arranged side by side, in parallel, in a spiral form. The two flow paths become one by an interconnection between them at the center of the spiral. For the sake of clarity, the size of flow paths has been exaggerated in FIG. 14. The flow paths there shown are arranged in an approximate Archimedes spiral. The flow paths are actually formed by concentric segments of a circle. Instead of being complete, each circle is interconnected to the next pair of circular paths. In the preferred form, the channels and ribs are formed on opposite faces of a sheet or plate which provides an uninterrupted thermal flow path. In this embodiment, they are formed as configurations on opposite sides of a cast metal plate. Alternatives are produced by molding or stamping or equivalent processes.

For purposes of identification, the water inlet opening is identified by the reference numeral 310, and the outlet opening of the collector is designated 312. One point on one of the input flow paths is designated with the reference numeral 314, and an approximately located point on the adjacent output flow path is numbered 316.

The other part of the solar energy collector is the bottom sheet 320. It is made of an insulating material the lower surface 322 of which is made reflective. The reflective surface is so thin that it cannot be separately illustrated and identified in the drawing. The lower sheet is flat and is bonded to the lower face of the plate so that water is confined to the channels in the lower face of the plate.

Variations in the System

It is possible, in some locales, that the body of pool or spa water will be heated excessively, particularly when the water is used as a heat sink. In that circumstance, when there is little or no sunlight, the solar collector may be used to dissipate some of that excess heat to the atmosphere by circulating the heated water through the solar energy collector.

The need for the check valves 28 and 29 can be eliminated by interconnecting line 26 and line 60 by the line 61 of FIG. 1. A gate valve V9 in line 61 is adjusted so that a selected proportion of the water taken from the pool is taken through the skimmer.

Although I have shown and described certain specific embodiments of my invention, I am fully aware that many modifications thereof are possible. My invention, therefore, is not to be restricted except insofar as is necessitated by the prior art.

I claim:

1. The method of treating a body of water confined in a container having a lower opening and an upper opening, each opening having communication with said body of water, with the aid of a pump and a heater connected to a water circulating circuit which method comprises the steps of:

causing water to flow through said circuit and through said heater in one direction from said body of water through said upper opening and then back to said body of water through said lower opening until the temperature of water in said body of water has been elevated to a selected level; and thereafter causing water from said body of water to continue to flow through said circuit in one direction while causing the water to flow from said body of water through said lower opening and to be returned to said body of water through said upper opening.

2. The invention defined in claim 1 in which the step of heating is accomplished using solar energy.

3. The invention defined in claim 2 which comprises the further step of transferring heat from said body of water to a load using a heat pump connected to receive water from said upper opening and to return it to said lower opening.

4. The invention defined in claim 3 in which the steps of heating the body of water and of removing heat from the body of water to a load are conducted simultaneously.

5. The invention defined in claim 1 in which the temperature of the water is measured by measuring the temperature of water in said circuit.

6. The method of treating a body of water confined in a container having a lower opening and an upper opening, each opening having communication with said body of water, with the aid of a pump and a heater connected in a portion of a water circulating circuit which method comprises the steps of:

causing water to flow through said portion of said water circulating circuit and through said heater in one direction from said body of water through said upper opening and then back to said body of water through said lower opening until the temperature of water in said body of water has been elevated to a selected level; and thereafter causing water from said body of water to continue to flow through said portion of said water circulating circuit in one direction while causing the water to flow from said body of water through said lower opening and to be returned to said body of water through said upper opening.

7. The invention defined in claim 6 in which the step of heating is accomplished using solar energy.

8. The invention defined in claim 7 which comprises the further step of transferring heat from said body of water to a load using a heat pump connected to receive water from said upper opening and to return it to said lower opening.

9. The invention defined in claim 8 in which the steps of heating the body of water and of removing heat from the body of water to a load are conducted simultaneously.

10. The invention defined in claim 6 in which the temperature of the water is measured by measuring the temperature of water in said circuit.

* * * * *